Nov. 24, 1942.            R. B. CAMPBELL            2,302,663
                           POPPET VALVE
               Filed April 26, 1940         3 Sheets-Sheet 1

INVENTOR
RODNEY B. CAMPBELL
BY
HARRIS, KIECH, FOSTER & HARRIS
ATTORNEYS

Nov. 24, 1942.    R. B. CAMPBELL    2,302,663
POPPET VALVE
Filed April 26, 1940    3 Sheets-Sheet 2
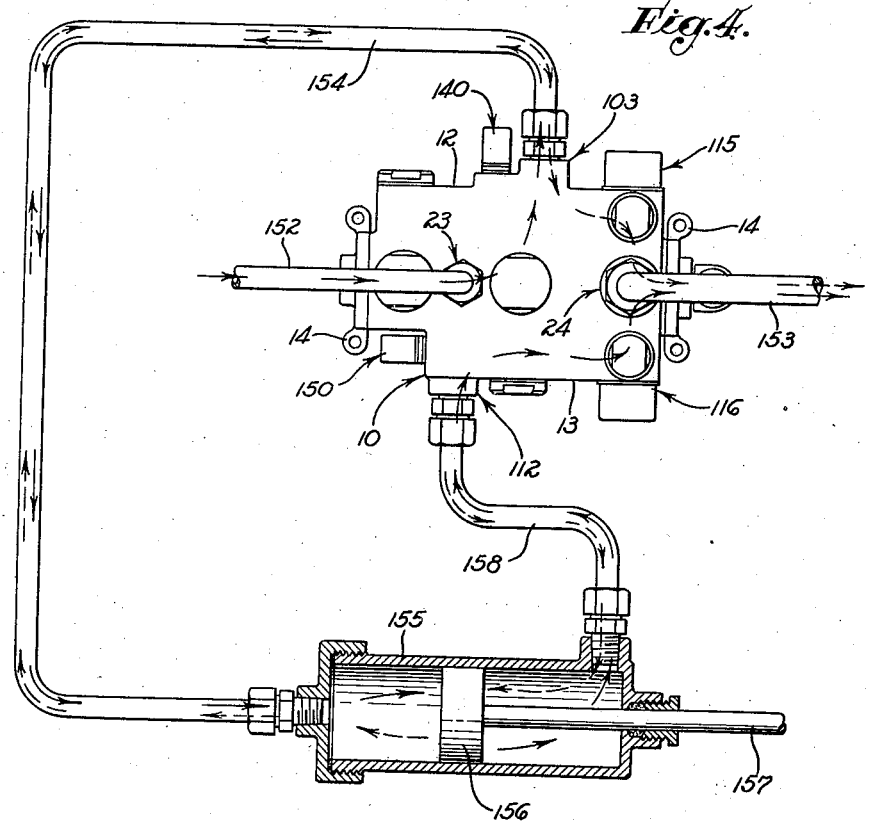
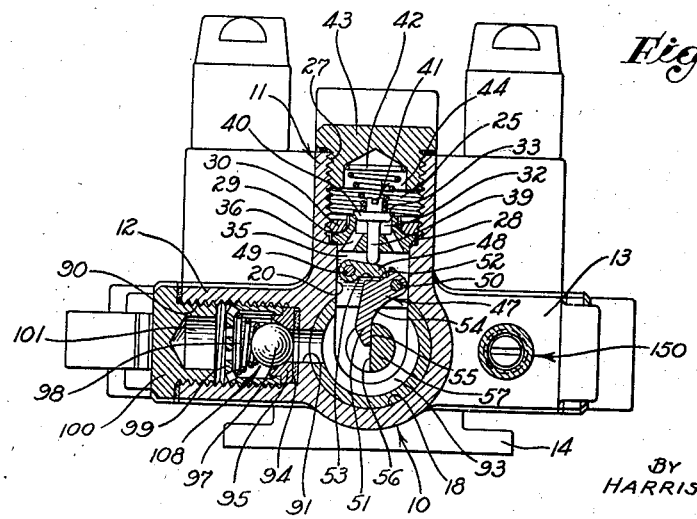
INVENTOR
RODNEY B. CAMPBELL
BY
HARRIS, KIECH, FOSTER & HARRIS
ATTORNEYS Nov. 24, 1942.  R. B. CAMPBELL  2,302,663
POPPET VALVE
Filed April 26, 1940  3 Sheets-Sheet 3

INVENTOR
RODNEY B. CAMPBELL
BY
HARRIS, KIECH, FOSTER & HARRIS
ATTORNEYS

Patented Nov. 24, 1942

2,302,663

UNITED STATES PATENT OFFICE 2,302,663

POPPET VALVE

Rodney B. Campbell, Los Angeles, Calif., assignor to John Eley, Jr., Los Angeles, Calif.

Application April 26, 1940, Serial No. 331,822

5 Claims. (Cl. 137—139)

My invention relates to valve devices, and more particularly to a selector valve device for use in selectively connecting a plurality of fluid flow pipes to a plurality of fluid discharge pipes.

The invention is of particular utility in connection with controlling flow of high pressure fluid to an actuating cylinder, and will be described in connection therewith, although it is to be understood that I do not intend to be limited thereto.

It is a primary object of my invention to provide a selector valve device adapted to connect selectively a source of pressure fluid with any one of a plurality of supply passages, the connection thereof being selectively controlled by my valve device.

A further object of my invention is to provide a valve device adapted to be connected into a main line supply operating fluid under high pressure, and adapted to selectively deliver operating fluid from the main line to any one of a plurality of supply pipes at a predetermined rate of flow without causing a substantial drop of fluid pressure in the main line.

It is a further object of my invention to provide such a valve device having a throw mechanism adapted to be operated by the application of very low operating pressures even against the action of abnormally high fluid pressures tending to oppose such operation. I prefer to accomplish this by the use of suitable cam mechanism for actuating the valve members of my valve device.

Another object of the invention is to provide a valve device of the type heretofore described in which a large number of the parts are interchangeable, and in which all the operating parts are readily replaceable.

Other objects and advantages of my invention will be apparent from the following specification and the drawings, which are for illustrative purposes only, and in which:

Fig. 2 is a vertical cross-sectional view taken on the line 2—2 of Fig. 1.

Fig. 4 is a diagrammatic view, partly in section, showing a preferred operation of the invention.

Figure 1:
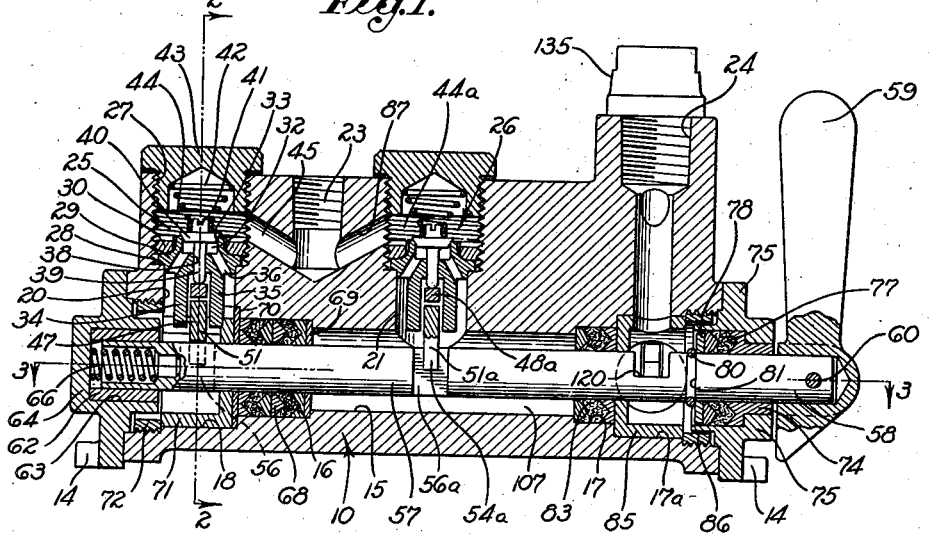
Fig. 1 is an elevational view, partly in section, of my valve device.

Referring to the drawings, I show a housing member 10 having an upright portion 11 and horizontal portions 12 and 13, the housing member 10 being provided with foot members 14 adapted to form a support for the device. The upright portion 11 of the housing member 10 is provided with a longitudinal bore 15 having counterbores 16 and 17 in each end thereof, the counterbore 16 being further counter-bored at 18 and the counterbore 17 being further counter-bored at 17a. The upright portion 11 of the housing member 10 is also provided with a first vertical bore 20 and a second vertical bore 21, both of which are preferably axially aligned with and intersect the longitudinal bore 15. Also provided in the upright portion 11 are a pressure fluid opening 23 and a discharge opening 24. In the upper end of the first vertical bore 20 is a first inlet valve means 25, and in the upper end of the second vertical bore 21 is a second inlet valve means 26, which will be described in detail hereinafter.

The first inlet valve means 25, as shown, is positioned in the outer end of the first vertical bore 20 which has a counterbored threaded portion 27 forming an annular shoulder 28 on which is seated an annular valve seat element 29 held in fluid-tight engagement with the annular shoulder 28 by an annular follower nut 30 threadedly received in the counterbored threaded portion 27. The valve seat element 29 is centrally bored to form a central chamber 32, the upper end of which forms a valve seat 33, and formed integrally with the lower side of the valve seat element are a pair of parallel plates 34 and 35. A plurality of passages 36 communicate between the central chamber 32 and the first vertical bore 20 below the valve seat element 29. The valve seat element 29 is also axially drilled at 38 to receive a stem 39 formed on a valve closure member 40 which is adapted to seat on the valve seat 33. The valve closure member 40 has a centralizing hub 41 projecting upwardly therefrom on which is centered a conical helical spring 42, the upper end of which engages a plug 43 threadedly received in the counterbored threaded portion 27, the helical spring normally being under compression tending to maintain the valve closure member 40 in seated relation on the valve seat 33. Communicating between a space 44 in the counterbored threaded portion 27 above the first inlet valve means 25 and the pressure fluid opening 23 is a passage 45.

To unseat the valve closure member 40, a primary actuating valve means 47 is provided, as best shown in Fig. 2, which is positioned between the parallel plates 34 and 35. The valve actuating means 47 includes a dog 48 pivoted by means of a pivot pin 49 secured to the depending plates 34 and 35, the outer end of the dog 48 engaging the lower end of the stem 39. Also pivoted to the parallel plates 34 and 35 by means of a pivot pin 50 is a cam element 51. The cam element 51 is provided with a shoulder 52 thereon which is adapted to engage the extreme lower end of the dog 48 when in the position shown in Fig. 2, which shoulder is adjacent the pivot pin 50, as shown. A second shoulder 53 is also formed on the cam element 51, preferably being parallel to the first shoulder 52 formed thereon and being positioned at a distance remote from the pivot pin 50. The cam element 51 also has a depending portion 54 and is provided with a vertical face 55 which is adapted to engage a flat face 56 formed on a control rod 57.

The control rod 57 extends entirely through the longitudinal bore 15 of the housing member 10 and has a projecting end 58 to which a control handle 59 is fixed by a pin 60 or other suitable means. The control rod 57 is journalled at its leftward end, as seen in Fig. 1, in a sleeve bearing 62 suitably secured in the bore 63 of a plug element 64 which closes the outer end of the counterbore 18, and which is held in fluid-tight relation with the housing member 10 by means of bolts 65 or other suitable holding means. The leftward end of the control rod 57, as seen in Fig. 1, is bored to receive a compression spring 66 which engages the control rod 57 and the plug element 64 to normally hold the control rod in the axial position shown in Fig. 1. A suitable packing element 68 is provided in the counterbore 16 surrounding the control rod 57 to form a fluid-tight seal around the control rod to prevent fluid from leaking therepast. The packing element 68 is held in position between an inner annular plate 69 and an outer annular plate 70, the outer annular plate compressing the packing element 68 and being held in position by a cup member 71 which is in turn held in position by a threaded ring 72 threadedly received in a threaded portion of the counterbore 18.

The rightward end of the control rod 57 is journalled in a bushing 74 received in an end plug 75 which is secured to the housing member 10 by bolts 76 or other suitable means. Engaging the inner end of the bushing 74 is a packing gland 77 held in position by a retainer ring 78 which engages a snap ring 80 carried by an annular groove 81 formed in the control rod 57. Surrounding the control rod 57, and seated in the counterbore 17a, is a cup-shaped retainer 85 held in place by a threaded ring 86 which is threadedly received in an outer threaded portion of the counterbore 17a, the retainer 85 retaining a packing gland 83 around the control rod 57.

Figure 5:
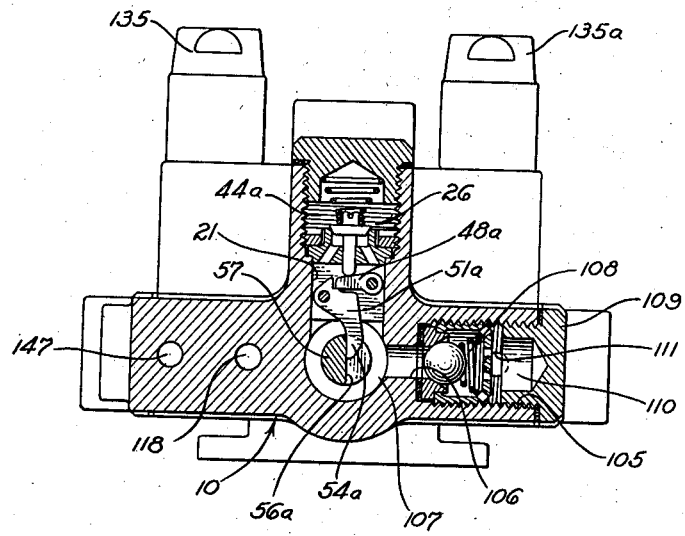
Fig. 5 is a cross-sectional view taken on the line 5—5 of Fig. 3.

The second inlet valve means 26, as best shown in Fig. 5, is identical in construction with the first inlet valve means 25 described hereinabove, except that a dog 48a and a cam element 51a thereof occupy positions which are exactly the reverse of the positions of the dog 48 and the cam element 51, a depending portion 54a of the cam element 51a engaging a second flat face 56a formed on the control rod 57 and disposed parallel and oppositely to the flat face 56 formed thereon. A space 44a above the second inlet valve means 26 communicates through a second passage 87 with the pressure fluid opening 23.

Formed in the horizontal portion 12 of the housing member 10 is a threaded bore 90 counterbored at 91 to communicate through an opening 92 formed in the cup-shaped member 71 with a chamber 93 around the control rod 57 and below the first inlet valve means 25. Seated on a shoulder formed by the inner end of the bore 90 is a washer 94 which supports an annular valve seat element 95 which is held in fluid-tight engagement with the washer by means of a threaded follower ring 96 threaded into the bore 90. A ball valve element 97 is normally retained in seated position on the valve seat element 95 by means of a compression spring 98 which engages it and also engages an apertured web 99 formed integrally with the follower ring 96. The outer end of the bore 90 is closed by a plug element 100, and a space 101 above the ball valve element 97 communicates through a primary discharge passage 102 with a first supply opening 103 which is suitably threaded to receive a pipe connection. The annular valve seat element 95 and the ball valve element 97, and their associated parts, constitute a first check valve means 104.

Figure 3:
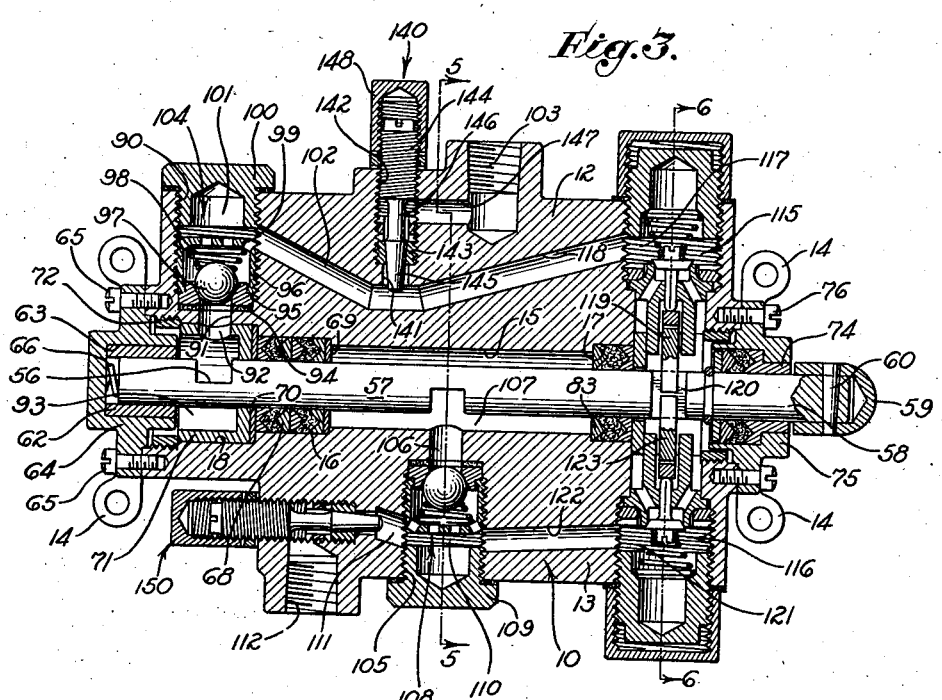
Fig. 3 is a horizontal cross-sectional view taken on the line 3—3 of Fig. 1.

Formed in the horizontal portion 13 of the housing member 10 is a second horizontal threaded bore 105, as best shown in Figs. 3 and 5, which is internally threaded like the bore 90 and is preferably of the same internal diameter and has a counterbore 106 communicating with a central chamber 107, the chamber also communicating with the under side of the second inlet valve means 26. The bore 105 contains a second check valve means 108 preferably identical in construction with the first check valve means 104 described hereinabove, the outer end of the bore 105 being closed by a plug 109, forming an outer chamber 110 which communicates through a passage 111 with a second supply opening 112 which is also internally threaded to receive a pipe connection.

Figure 6:
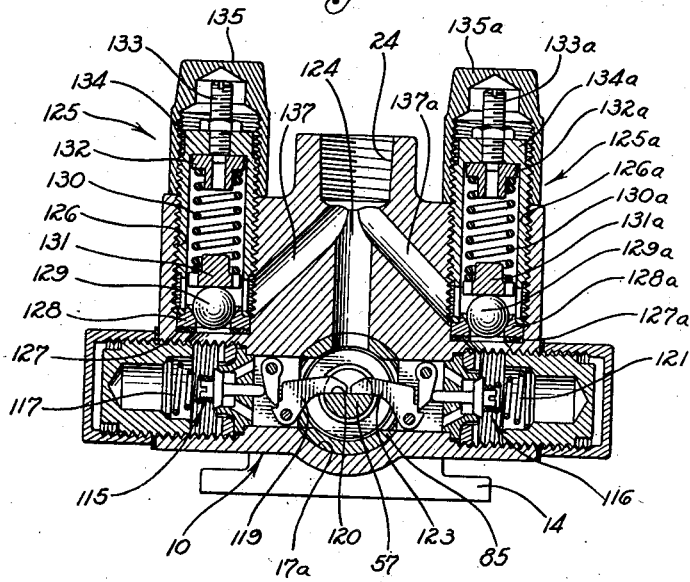
Fig. 6 is a cross-sectional view taken on the line 6—6 of Fig. 3.

Also disposed in the housing member 10, as best shown in Figs. 3 and 6, are a first discharge valve means 115 and a second discharge valve means 116 which are identical in construction with each other and with the first and second inlet valve means 25 and 26, and reference is hereby made to the detailed description of the construction of the first inlet valve means 25, as shown in Fig. 1, for the parts thereof. It is also to be noted that corresponding parts of the valve means 25, 26, 115, and 116 have the same dimensions and are fully interchangeable, which greatly facilitates assembly and replacement of parts. A space 117 outside the first discharge valve means 115 communicates with a passage 118 which in turn communicates with the primary discharge passage 102. The first discharge valve means 115 includes a pivoted cam element 119, similar to the cam element 51, which engages a flat face 120 formed on the control rod 57 at a 90° angle to each of the faces 56 and 56a. Likewise, a space 121 outside the second discharge valve means 116 communicates with a passage 122 which in turn communicates with the outer chamber 110. The second discharge valve means 116 also includes a pivoted cam element 123, similar to the cam element 51, and which engages the flat face 120 formed on the control rod 57, as best shown in Figs. 3 and 6. The inside areas of the first and second discharge valve means 115 and 116 communicate through a passage 124 with the discharge opening 24.

Also provided in the upright portion 11 of the housing member 10 is a first pressure relief valve 125 and a second pressure relief valve 125a, as best shown in Fig. 6. The first pressure relief valve 125 is adapted to be received in a threaded bore 126 in the upright portion 11 of the housing member 10 and includes a washer 127 on which is seated a valve seat ring 128 adapted to seat a ball valve 129, the ball valve normally being held in pressure engagement with the valve seat ring by a coil spring 130 operating through an engaging member 131, the other end of the coil spring engaging a stem 132 adapted to be vertically adjusted by a screw 133 threaded through a cup plug 134. A dust cap 135 is threaded over the cup plug 134 to completely enclose the same. The lower side of the first pressure relief valve 125 communicates with the space 117, and the upper side thereof communicates through a passage 137 with the discharge opening 24. The second pressure relief valve 125a is identical in construction with the first pressure relief valve 125, and corresponding parts are similarly numbered with the suffix *a*. The lower side of the second pressure relief valve 125a communicates with the space 121, and the upper side thereof communicates through the passage 137a with the discharge opening 24.

As shown in Fig. 3, the horizontal portion 12 of the housing 10 also includes a first metering valve 140 which comprises a bore 141 communicating with the passage 102 and having a threaded counterbore 142 into which is threaded a valve seat element 143 and a valve element 144, the latter having a metering head 145 and a cut-away portion 146 communicating with a transverse opening 147 which in turn communicates with the first supply opening 103. A removable dust cap 148 seals the first metering valve 140 but may be removed to permit adjustment of the valve element 144 to permit a greater or lesser amount of fluid to flow through the metering valve to the first supply opening 103.

A second metering valve 150 is provided in the horizontal portion 13 so as to meter the flow of fluid from the passage 111 to the second supply opening 112, the second metering valve member 150 being identical in construction with the first metering valve 140 described hereinabove.

As shown in Fig. 4, the pressure fluid opening 23 is adapted to receive supply piping 152 which leads to the housing from a suitable source of supply (not shown) of high pressure fluid. The discharge opening 24 is adapted to receive discharge piping 153 which leads from the housing 10 to a suitable point of discharge (not shown). The first supply opening 103 is adapted to receive suitable supply tubing 154 which leads from the housing 10 to any desired point of use of the fluid handled by the device, and for the purpose of illustration I have shown this supply tubing connected to one end of a pump cylinder 155 having a piston 156 therein to which is connected a piston rod 157 which extends out through the end of the cylinder. The other end of the cylinder 155 is connected by means of a supply conduit 158 to the second supply opening 112.

With the parts of the device in the positions shown in the drawings, in which the handle 59 is vertically disposed, the first and second inlet valve means 25 and 26 are both closed so that no fluid under pressure can flow from the pressure fluid opening 23 through the device to either the first or second supply opening 103 or 112. With the parts in this position, the high pressure fluid from the supply piping 152 will fill the pressure fluid opening 23, the passage 45, the space 44 above the first inlet means 25, the secondary passage 87, and the space 44a above the second inlet valve means 26.

When the control rod 57 is rotated by means of the control handle 59 in a counter-clockwise direction, as seen in Fig. 2, the flat face 56 on the control rod moves against the vertical face 55 of the cam element 51, rotating the latter on its pivot pin 50, and the shoulder 52 engaging the end of the dog 48 moves the latter upwardly, transmitting this movement through the stem 39 to the valve closure member 40, unseating the same from its valve seat 33 so as to permit a flow of high pressure fluid downwardly from the space 44 through the valve seat 33 and the passages 36 into the chamber 93 below the first inlet valve means 25 and around the control rod 57. The initial upward movement of the valve closure member 40 is necessarily against the downward pressure of the helical spring 42 and the considerable pressure exerted by the pressure fluid on the top of the valve element in the space 44, which pressure may, at times, exceed 2000 pounds per square inch. Due to the cam action exerted by the primary valve actuating means 47 on the stem 39, the control rod 57 may be rotated to open the first inlet valve means 25 by only a slight pressure exerted on the control handle 59, not to exceed 10 inch pounds of force. This feature is a primary advantage of my construction in that only a very short control handle 59 is required instead of the long handle normally required in the art, and only a small amount of pressure on the control handle is necessary to open the inlet valve means 25 of the device against even extremely high fluid pressures tending to maintain the valve mechanism closed.

As soon as the valve element 40 is unseated from its valve seat 33, and pressure fluid starts to flow through the first inlet valve means 25, the downwardly acting pressure on the upper face of the valve element 40 is relieved, and the valve element may thereafter be raised more rapidly, since this force tending to maintain it in closed position has been relieved. I accomplish this by the second shoulder 53 formed on the cam element 51, which engages the pivoted dog 48 as soon as the shoulder 52 clears the end of the pivoted dog by continued rotation of the control rod 57. Since the second shoulder 53 is spaced remote from the pivot pin 50, continued rotation of the control rod 57 increases the rate of opening of the valve closure member 40 to quickly fully open the first inlet valve means 25, to permit a free flow of pressure fluid therethrough.

With the opening of the first inlet valve means 25, the pressure fluid flows downwardly therethrough, through the chamber 93, and around the control rod 57, and opens the first check valve means 104 by moving the ball valve element 97 thereof away from its seat against the action of the compression spring 98 to permit the pressure fluid to flow therethrough, through the space 101, the primary discharge passage 102, the first metering valve 140 which has previously been adjusted to meter a predetermined quantity of flow therethrough, into the transverse opening 147 from whence the pressure fluid flows directly through the first supply opening 103 into the supply tubing 154. The pressure fluid then flows through the supply tubing 154 into the leftward end of the pump cylinder 155, as shown in Fig. 4, to exert a high fluid pressure on the piston 156, causing it and its connected piston rod 157 to move to the right.

Such counter-clockwise rotation of the control rod 57, as seen in Fig. 2, simultaneously opens the second discharge valve means 116. This is accomplished by the flat face 120 of the control rod engaging and moving the cam element 123 exactly as described in connection with the cam element 51 of the first inlet valve means 25, to open the second discharge valve means 116. The operation of the second discharge valve means 116 is identical with that of the first inlet valve means 25, as described hereinabove.

When the second discharge valve means 116 is open, it permits exhaust fluid to discharge from the right-hand end of the pump cylinder 155 through the supply conduit 158, the second supply opening 112, the second metering valve 150 which has been previously adjusted so as to permit a flow of fluid therethrough at a predetermined rate, the passage 111, the outer chamber 110, the passage 122, the space 121, and inwardly through the second discharge valve means 116 around the control rod 57, and upwardly and outwardly through the passage 124 and the discharge opening 24 into the discharge piping 153, whence this exhaust fluid may flow to a fluid reservoir.

It will thus be understood that when the control rod 57 is rotated in a counter-clockwise direction, as seen in Fig. 2, the first inlet means 25 will be opened to permit pressure fluid to flow from the pressure fluid opening 23 to the first supply opening 103, and the second discharge valve means 116 will simultaneously be opened to permit exhaust fluid at low pressure to discharge from the second supply opening 112 to the discharge opening 24. It is also to be noted that when the primary inlet valve means 25 is opened, as described, the surplus pressure fluid not metered through the first metering valve 140 has access to the lower side of the first pressure relief valve 125, which causes the ball valve 129 to move away from its valve seat ring 128 against the action of the coil spring 130 to permit the surplus pressure fluid to discharge through the passage 137 directly into the discharge opening 24 and the discharge piping 153. The coil spring 130, however, is adjusted so as to maintain a considerable force on the ball valve 129 tending to close it, so as to maintain substantially full pressure on the pressure fluid in the supply piping 152, which is an important feature of the invention in that it permits other similar valve devices to be operated with the pressure fluid from the supply piping 152 in sequence or otherwise without any substantial fluid pressure drop across the first of such valve devices to be operated.

When the control rod 51 is rotated in a clockwise direction, as seen in Fig. 2, the first inlet valve means 25 and the second discharge valve means 116 remain closed due to the fact that the faces 56 and 120, respectively, move away from the cam elements of these valve means. Upon such clockwise movement of the control rod, however, the flat face 56a engages the cam element 51a to open the second inlet valve means 26, and the flat face 120 engages the cam element 119 to open the first discharge valve means 115 simultaneously. Since the second inlet valve means 26 and the first discharge valve means 115 are identical in construction and operation with the first inlet valve means 25, described hereinabove, reference is made thereto for the operation of the valve means.

With the opening of the second inlet valve means 26, high pressure fluid flows from the pressure fluid opening 23 through the secondary passage 87 and the space 44a, through the second inlet valve means 26, downwardly around the control rod 57, through the space 107, and through the counterbore 106 and the second check valve means 108 into the outer chamber 110, whence it flows through the second metering valve 150 and the second supply opening 112 into the supply conduit 158 and into the right-hand end of the pump cylinder 155, to force the piston 156 therein and its connected piston rod 157 to the left, as seen in Fig. 4. In this adjustment of the device, the surplus high pressure fluid, not metered through the second metering valve 150, passes through the second pressure relief valve 125a, the passage 137a, and the passage 124 into the discharge opening 24, the same as described above in connection with the first pressure relief valve 125, to continue to maintain full pressure in the supply piping 152. A further function of the first and second pressure relief valves 125 and 125a is that they may be adjusted so as to compensate for the unequal areas on opposite ends of the piston 156.

With the opening of the first discharge valve means 115, the exhaust fluid may then discharge from the left-hand end of the pump cylinder 155, as shown in Fig. 4, through the supply tubing 154, the first supply opening 103, the transverse opening 147, and the first metering valve 140, into the passage 118, whence it flows through the first discharge valve means 115 inwardly around the control rod 57 and upwardly and outwardly through the passage 124 and the discharge opening 24 and the discharge piping 153 to a suitable point of discharge.

It will thus be seen that by rotating the control handle 59 in one direction, high pressure fluid is admitted to one end of the pump cylinder 155, and the other end of the pump cylinder is put into open communication with the discharge piping 153. Upon a reverse movement of the control handle 59, the high pressure fluid is admitted into the other end of the pump cylinder 155, and the pump cylinder on the opposite side of the piston 156 is put into open communication with the discharge piping 153. Thus, the action of the piston rod 157 may be fully controlled by movement of the control handle 59, the piston rod being designed to operate any desired mechanical device.

By adjusting either or both of the metering valves 140 or 150, the rate of flow of fluid through the device may be accurately controlled so as to regulate the rate of movement of the piston rod 157, as desired.

Although I have shown and described a preferred embodiment of my device, it will be understood that my device and parts thereof may have other applications and embodiments, and I do not intend to be limited to the construction shown and described, but intend to be accorded the full scope of protection of the following claims.

I claim as my invention:

1. In a valve device, the combination of: a valve seat member having an opening therethrough; a valve element adapted to seat on said seat member and having a stem extending through said opening; a first pivot disposed at one side of said stem; a dog pivoted on said first pivot and rotatable in one direction to engage said stem at a point between the ends of said dog; a second pivot disposed at the opposite side of said stem; cam means pivoted on said second pivot and so constructed to be rotatable in the opposite direction to be initially engageable with said dog at a point between said stem and the end of said dog remote from said first pivot; and an actuating element rotatable in said one direction to engage said cam means for rotating said cam means on said second pivot so as to apply a relatively great opening force to said valve element through said dog and said stem.

2. In a valve device, the combination of: a valve seat member having an opening therethrough; a valve element adapted to seat on said seat member and having a stem extending through said opening; a first pivot disposed at one side of said stem; a dog pivoted on said first pivot and rotatable in one direction to engage said stem at a point between the ends of said dog; a second pivot disposed at the opposite side of said stem; cam means pivoted on said second pivot and so constructed to be rotatable in the opposite direction to be initially engageable with said dog at a first point between said stem and the end of said dog remote from said first pivot and subsequently engageable with said dog at a second point between said stem and said first pivot; and an actuating element rotatable in said one direction to engage said cam means for rotating said cam means on said second pivot so as to cause said cam means to initially engage said dog at said first point and subsequently engage said dog at said second point.

3. In a valve device, the combination of: a valve seat member having an opening therethrough; a valve element adapted to seat on said seat member and having a stem extending through said opening; a first pivot disposed at one side of said stem; a dog pivoted on said first pivot and rotatable in one direction to engage said stem at a point between the ends of said dog; a second pivot disposed at the opposite side of said stem; cam means pivoted on said second pivot and so constructed as to be rotatable in the opposite direction to be initially engageable with said dog at a point between said stem and the end of said dog remote from said first pivot; and a rotatable control rod rotatable in said one direction to engage said cam means for rotating said cam means on said second pivot so as to apply a relatively great opening force to said valve element through said dog and said stem.

4. In a valve device, the combination of: a valve seat member having an opening therethrough; a valve element adapted to seat on said seat member and having a stem extending through said opening; a first pivot disposed at one side of said stem; a dog pivoted on said first pivot and rotatable in one direction to engage said stem; a second pivot disposed at the opposite side of said stem; cam means pivoted on said second pivot and rotatable in the opposite direction to engage said dog to rotate said dog in said one direction, said cam means being provided with an end portion remote from said second pivot; and a rotatable control member constructed and arranged so that when rotated in said one direction it engages said end portion and rotates said cam means in said opposite direction and when said control member is rotated in said opposite direction it does not engage said cam means for at least a substantial portion of such rotation.

5. In a valve device, the combination of: a valve seat member having an opening therethrough; a valve element adapted to seat on said seat member and having a stem extending through said opening; a first pivot disposed at one side of said stem; a dog pivoted on said first pivot and rotatable in one direction to engage said stem; a second pivot disposed at the opposite side of said stem; cam means pivoted on said second pivot and rotatable in the opposite direction to engage said dog to rotate said dog in said one direction, said cam means being provided with an end portion remote from said second pivot; and a rotatable control member having a flat face and constructed and arranged so that when rotated in said one direction a portion of said flat face engages said end portion and rotates said cam means in said opposite direction and when said control member is rotated in said opposite direction it does not engage said cam means for at least a substantial portion of such rotation.

RODNEY B. CAMPBELL.